No. 815,523. PATENTED MAR. 20, 1906.
F. G. FREESE.
CUSHION TIRE.
APPLICATION FILED DEC. 30, 1904.
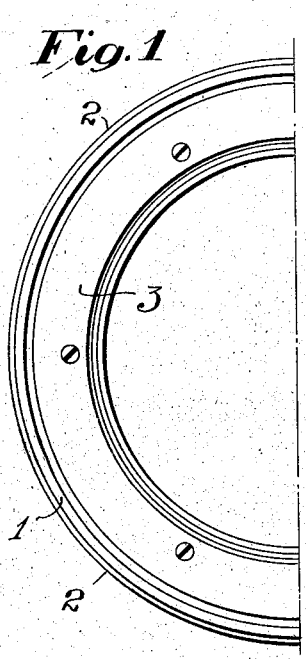
Fig. 1
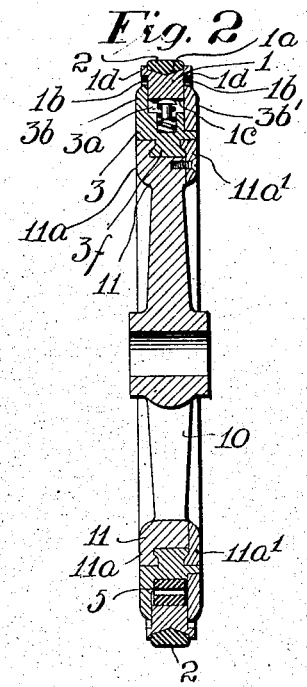
Fig. 2   Fig. 3
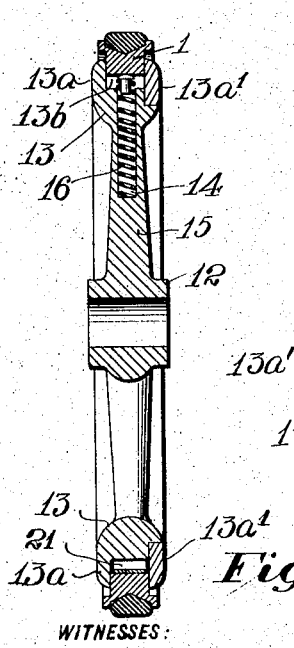
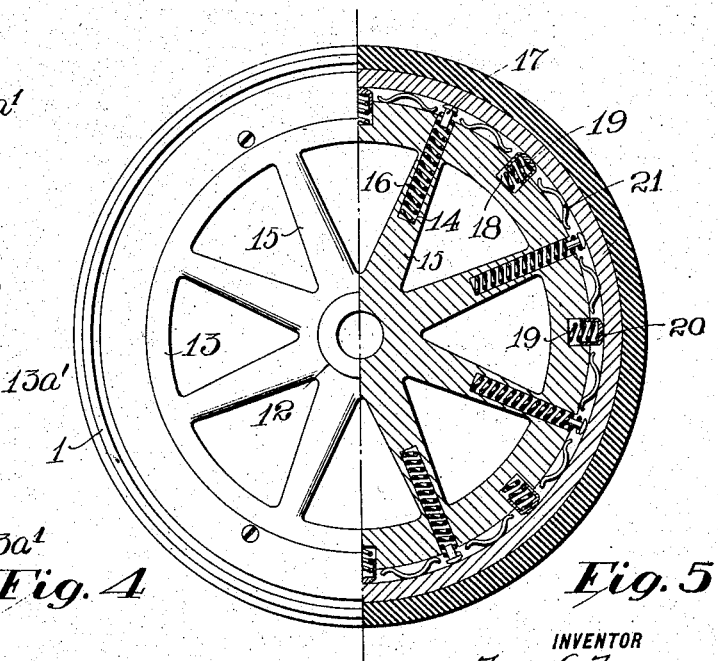
Fig. 4   Fig. 5
WITNESSES:
Utley E. Crane Jr.
Louis H. Buck.
INVENTOR
Frank G. Freese
BY
Chas. N. Butler
ATTORNEY.

UNITED STATES PATENT OFFICE.

FRANK G. FREESE, OF PHILADELPHIA, PENNSYLVANIA.

CUSHION-TIRE.

No. 815,523.   Specification of Letters Patent.   Patented March 20, 1906.

Application filed December 30, 1904. Serial No. 238,944.

*To all whom it may concern:*

Be it known that I, FRANK G. FREESE, a citizen of the United States, residing at Philadelphia, in the county of Philadelphia and State of Pennsylvania, have invented certain Improvements in Cushion-Tires, of which the following is a specification.

This invention relates more particularly to cushion-tires for vehicles, as automobiles, whereby an outer metal ring can be engaged in cushioned relation to an inner metal ring in such manner that elasticity, strength, and endurance are provided by a simple construction that is readily produced, assembled, and dissociated, and whose parts are protected from interference with their operations by dirt or other obstructions.

The nature and characteristic features of my improvements will more fully appear by reference to the following description and the accompanying drawings in illustration thereof, of which—

Figure 1 represents a side elevation of half of a tire made in accordance with my invention. Fig. 2 represents a transverse sectional view of a wheel having my improved tire applied thereto. Fig. 3 represents a longitudinal sectional view of half a wheel with my improvements applied thereto. Fig. 4 represents a transverse sectional view of a wheel having a modified form of my invention applied thereto, and Fig. 5 represents a side elevation and partial section of the construction shown in Fig. 4.

Referring to Figs. 1, 2, and 3 of the drawings, the tire comprises the integrally-formed exterior metal ring 1, having the rubber tread 2 and the interior metal ring 3 for holding the ring 1, the latter being movably supported by the cushions 4, 5, and 6, wholly inclosed by the engaging rings 1 and 3. The ring 1 has the peripheral groove $1^a$ for holding the rubber tread 2, the parallel faces $1^b$, intersected by the interior cylindrical surface $1^c$, forming a body of rectangular cross-section, and the laterally-extending flanges $1^d$. The body of the ring 1 is engaged within the peripheral channel $3^a$ of the inner ring 3, which is formed by the flanges $3^b$ and $3^{b'}$ with parallel bearing-faces engaging the corresponding faces of the ring 1, the flange $3^{b'}$ being detachable to permit the ring 1 to be placed and displaced. The cushions 4 consist of coiled springs seated in recesses $3^c$,
formed in the inner ring in the bottom of the channel, the springs having the caps $4^a$, which bear against the inner cylindrical surface $1^c$ of the ring 1. The cushions 5 are hollow rubber cylinders placed in semicylindrical recesses $3^d$, formed in the bottom of the channel, and bear against the surface $1^c$ of the outer ring. The cushions 6 are rubber columns supported in the recesses $3^e$, formed in the channel, and having the caps $6^a$ bearing against the inner surface of the ring 1. To obstruct any tendency of the outer ring to rotate independently of the inner ring and to provide a flexible connection between them, the oppositely-inclined coiled springs 7 are connected to the inner ring by the pins 8 and to the outer ring by the pins 9, the springs being wholly inclosed between the rings which have the recesses $1^d$ and $3^e$ for receiving the springs when the rings are pressed together. The ring 3 has the inner rim $3^f$, suitably of dovetail cross-section, for engaging it on the wheel 10, whose rim 11 has the flanges $11^a$ and $11^{a'}$ engaging the rim $3^f$ and forming a dovetail channel, within which the rim fits, the flange $11^{a'}$ being detachable to permit the tire to be placed and displaced.

As shown in Figs. 4 and 5, the wheel 12 has its rim 13 provided with the flanges $13^a$ and $13^{a'}$, forming a channel $13^b$ for receiving the ring 1, having the conformation described, the flange $13^{a'}$ being detachable to permit the ring to be placed and displaced. In the bottom of the channel are formed the sockets 14, which extend through the rim into the wheel-spokes 15 and contain the coiled springs 16, the springs having the caps 17 thereon which bear against the inner surface of the ring. Within the channel and between the spokes sockets 18 are formed in the rim and receive the coiled springs 19, having the caps 20 thereon bearing against the inner surface of the ring, the caps telescoping with the sockets. Between the springs 16 and 19 are leaf-springs 21, resting upon the bottom of the channel and bearing against the inner surface of the ring.

As the rings forming the tire can be forged as integers, as the construction prevents interference by obstacles with the operation, and as the cushioning members are wholly inclosed, the tire has little or no tendency to get out of order and provides the strength, endurance, and flexibility that is desired.

Having described my invention, I claim—

1. A tire comprising an outer ring, a rim having flanges connected therewith for engaging said outer ring, cushioning mechanism for supporting said outer ring, in combination with a wheel having a rim and flanges for engaging said first rim thereto, substantially as specified.

2. A tire comprising an outer ring, an inner ring having flanges for engaging said outer ring and a rim for holding said inner ring, a wheel having a rim provided with flanges for engaging the rim of said inner ring, and cushioning members between said rings, substantially as specified.

3. A tire comprising a solid outer ring, a solid inner ring having embracing means engaging said outer ring in reciprocating relation thereto, and cushioning mechanism disposed between said rings, in combination with a wheel having a rim to which said inner ring is engaged, substantially as specified.

4. A tire comprising a solid outer ring, a solid inner ring to which said outer ring is engaged in reciprocating relation, and cushioning mechanism by which said outer ring is flexibly supported by said inner ring, in combination with a wheel having a rim provided with embracing means for engaging said inner ring thereto, substantially as specified.

In testimony whereof I have hereunto set my hand, this 28th day of December, 1904, in the presence of the subscribing witnesses.

FRANK G. FREESE.

Witnesses:
 ROBERT JAMES EARLEY,
 UTLEY E. CRANE, Jr.